(12) United States Patent
Seok et al.

(10) Patent No.: US 10,556,509 B2
(45) Date of Patent: Feb. 11, 2020

(54) TOUCH INPUT DEVICE AND VEHICLE INCLUDING THE SAME

(71) Applicants: HYUNDAI MOTOR COMPANY, Seoul (KR); KIA MOTORS CORPORATION, Seoul (KR)

(72) Inventors: Donghee Seok, Suwon-si (KR); Gideok Kwon, Seoul (KR); Jong Bok Lee, Suwon-si (KR); HeeJin Ro, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/176,964

(22) Filed: Oct. 31, 2018

(65) Prior Publication Data

US 2019/0210465 A1    Jul. 11, 2019

(30) Foreign Application Priority Data

Jan. 5, 2018    (KR) .................. 10-2018-0001954

(51) Int. Cl.
*G06F 3/0488*    (2013.01)
*B60K 37/06*    (2006.01)

(52) U.S. Cl.
CPC ............ *B60K 37/06* (2013.01); *G06F 3/0488* (2013.01); *B60K 2370/1438* (2019.05)

(58) Field of Classification Search
None
See application file for complete search history.

(56) References Cited

U.S. PATENT DOCUMENTS

| | | | | |
|---|---|---|---|---|
| 2006/0097991 A1* | 5/2006 | Hotelling | .............. | G06F 3/0416 345/173 |
| 2009/0243817 A1* | 10/2009 | Son | ...................... | G06F 3/0414 340/407.2 |
| 2011/0291939 A1* | 12/2011 | Tsukahara | ............. | G06F 3/0202 345/168 |
| 2011/0291966 A1* | 12/2011 | Takao | ..................... | G06F 3/044 345/173 |
| 2015/0123931 A1* | 5/2015 | Kitchens | ............... | G06F 3/0414 345/174 |

* cited by examiner

*Primary Examiner* — Nicholas J Lee
(74) *Attorney, Agent, or Firm* — Morgan, Lewis & Bockius LLP

(57) ABSTRACT

A touch input device includes: a frame having a plurality of frame holes; a flexible printed circuit board coupled to one surface of the frame and having a plurality of holes corresponding to the plurality of frame holes; a sensor electrode disposed on the flexible printed circuit board; and a sensor integrated circuit (IC) electrically connected to the sensor electrode and configured to sense a change in capacitance value of the sensor electrode.

14 Claims, 8 Drawing Sheets

TOUCH INPUT DEVICE AND VEHICLE INCLUDING THE SAME

CROSS-REFERENCE TO RELATED APPLICATION

This application is based on and claims priority under 35 U.S.C. § 119 to Korean Patent Application No. 10-2018-0001954, filed on Jan. 5, 2018 in the Korean Intellectual Property Office, the disclosure of which is incorporated by reference herein in its entirety.

TECHNICAL FIELD

The present disclosure relates to a touch input device and a vehicle including the same, and more particularly, to a touch input device having a plurality of holes on a touch surface, and a vehicle including the same.

BACKGROUND

With the development of electronic communication technology, various kinds of electronic products are being manufactured. Recently, many electronic products are increasingly emphasizing the convenience of control and the aesthetic effect. With such a trend, input devices such as keyboards or keypads are being diversified.

Input devices are used in various kinds of displays for providing information to users, such as a portable terminal, a laptop, a smart phone, a smart pad, and a smart TV. Recently, with the development of electronic products, a method of inputting command signals using touches is used in addition to a method of inputting command signals using operation keys, dials, or the like.

A touch input device is one of input devices constituting an interface between a user and an information communication device using various displays. The touch input device enables a user to interface with an information communication device when the user touches or approaches a touch pad or a touch screen with an input tool such as a user's finger or a touch pen.

Vehicles provide additional functions for user convenience, such as an audio function, a video function, a navigation function, air conditioning control, seat control, lighting control, and the like, in addition to a driving function.

Recently, a touch input device is used as an input device for controlling the above-mentioned additional functions of the vehicle.

The touch input device, which is generally disposed inside a vehicle, is provided as a touch pad below a shift lever of the vehicle, or in the form of a touch screen on a center fascia of the vehicle.

When a touch pad is provided below a shift lever of a vehicle, separate space for the touch pad is needed, which is disadvantageous in view of utilization of space.

When a touch screen is provided on a center fascia of a vehicle, a user's finger or a touch pen covers the touch screen when the user touches the touch screen, which obstructs a driver's view.

Further, if a touch screen is added in the inside of a vehicle to receive touch inputs when a large-sized digital instrument panel and a head-up display (HUD) are provided so that no additional display is needed, cost increases, which may reduce product competitiveness.

SUMMARY

It is an aspect of the present disclosure to provide a touch input device having a plurality of holes on a touch surface, and a vehicle including the touch input device.

It is another aspect of the present disclosure to provide a touch input device including a plurality of holes through which air or sound easily enters and exits, and a vehicle including the touch input device.

It is another aspect of the present disclosure to provide a touch input device using a vent of an air conditioner as a touch surface, and a vehicle including the touch input device.

Additional aspects of the present disclosure will be set forth in part in the description which follows and, in part, will be obvious from the description, or may be learned by practice of the present disclosure.

In accordance with an exemplary embodiment of the present disclosure, a touch input device includes: a frame having a plurality of frame holes; a flexible printed circuit board coupled to one surface of the frame and having a plurality of holes corresponding to the plurality of frame holes; a sensor electrode disposed on the flexible printed circuit board; and a sensor integrated circuit (IC) electrically connected to the sensor electrode and configured to sense a change in capacitance value of the sensor electrode.

The sensor electrode may include an Rx electrode and a Tx electrode.

The Rx electrode may be formed on one surface of the flexible printed circuit board, and the Tx electrode may be formed on the other surface opposite to the one surface of the flexible printed circuit board.

When the Rx electrode extends along a first direction, the Tx electrode may extend along a second direction that intersects the first direction.

The sensor electrode may be formed between the plurality of holes.

When the Rx electrode is provided on a front surface of the flexible printed circuit board and the Tx electrode is provided on a rear surface of the flexible printed circuit board, the Rx electrode and the Tx electrode may be arranged to overlap each other in a front-rear direction.

The frame may be made of a nonconductive material.

The flexible printed circuit board may further include a connector, and the connector electrically connects the flexible printed circuit board to a printed circuit board on which the sensor IC is mounted.

In accordance with another exemplary embodiment of the present disclosure, a touch input device includes: a base having a plurality of base holes and including a metal composite; a sensor electrode including a plated sensor electrode or a metalized sensor electrode; and a sensor integrated circuit (IC) electrically connected to the sensor electrode, mounted on a printed circuit board, and configured to sense a change in capacitance value of the sensor electrode.

The sensor electrode may include a first sensor electrode formed on one surface of the base, and a second sensor electrode formed on the other surface opposite to the one surface of the base.

The base may include a curved surface or a discontinuous surface.

The touch input device may further include a connector electrically connects the sensor electrode and the printed circuit board.

When the first sensor electrode is formed on a front surface of the base and the second sensor electrode is formed on a rear surface of the base, the first sensor electrode and the second sensor electrode may overlap to each other in a front-rear direction The touch input device may further include a protective layer provided on one surface of the base to cover the sensor electrode.

In accordance with still another exemplary embodiment of the present disclosure, a vehicle includes an air conditioner and a touch input device. The touch input device includes: a base including a metal composite and having a plurality of holes through which air having passed through the air conditioner is discharged; a sensor electrode formed by a plating or metalizing process after irradiating the base with a laser; and a sensor integrated circuit (IC) electrically connected to the sensor electrode and configured to sense a change in capacitance value of the sensor electrode.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Configurations illustrated in the embodiments and the drawings described in the present specification are only the preferred embodiments of the present disclosure, and thus, it is to be understood that various modified examples, which may replace the embodiments and the drawings described in the present specification, are possible when filing the present application.

Like reference numerals or symbols denoted in the drawings of the present specification represent members or components that perform the substantially same functions.

The terms used in the present specification are used to describe the embodiments of the present disclosure. Accordingly, it should be apparent to those skilled in the art that the following description of exemplary embodiments of the present disclosure is provided for illustration purpose only and not for the purpose of limiting the disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the embodiments according to the present disclosure will be described in detail with reference to the accompanying drawings.

Figure 1:
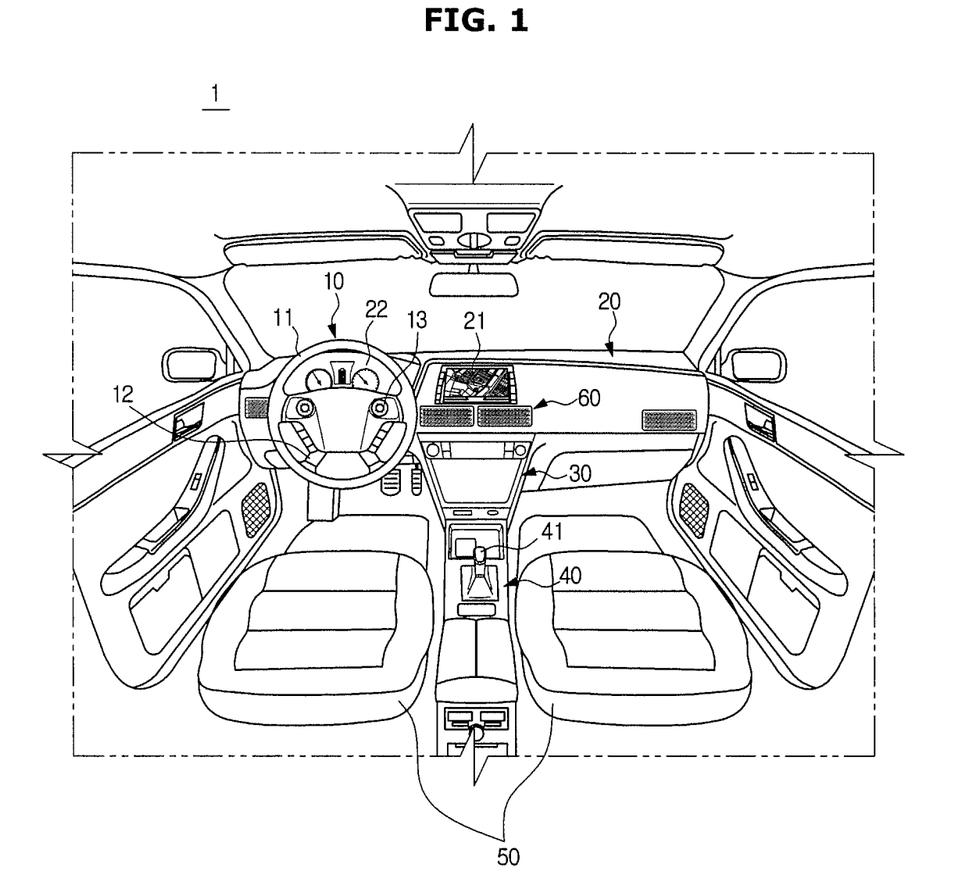
FIG. 1 shows an interior of a vehicle in which a touch input device according to an exemplary embodiment of the present disclosure is installed.

FIG. 1 shows an interior of a vehicle in which a touch input device according to an exemplary embodiment of the present disclosure is installed.

Referring to FIG. 1, a vehicle 1 may include a seat 50 on which a driver or a passenger is seated, a gear box 40, and a dashboard 20 in which a center fascia 30, a steering wheel 10, etc. are installed.

The center fascia 30 may have a vent 60 of an air conditioner, a clock, an audio system, a display 21, etc.

The air conditioner may adjust the inside temperature, humidity, air quality, and flow of air inside the vehicle 1 to maintain the inside of the vehicle 1 pleasant. The air conditioner may include at least one vent 60 installed in the center fascia 30 to discharge air. According to an embodiment of the present disclosure, the vent 60 may be used as a touch surface of a touch input device, while discharging air. The vent 60 may include a plurality of holes to discharge air.

A user may approach the vent 60, touch the vent 60, or input a gesture to the vent 60. The user may control various devices inside the vehicle 1, such as the air conditioner, the audio system, the display 21, etc., by approaching the vent 60, touching the vent 60, or inputting a gesture to the vent 60. For example, the user may input a gesture of touching the vent 60 and then dragging it from left to right side to increase the volume of the audio system. Further, the user may input various commands through various gestures, touches, etc.

When the vent 60 is used as a touch surface, the user may control the display 21 without covering a screen of the display 21. Furthermore, since there is no need to provide a touch pad around a shift lever 41, utilization of space may be improved.

The display 21 may be embedded in the center fascia 30 of the vehicle 1 or protrude on the dashboard 20. The display 21 may integrally perform an audio function, a video function, and a navigation function according to the user's operation.

The steering wheel 10 may be used to change the traveling direction of the vehicle 1. The steering wheel 10 may include a rim 11 that is gripped by the driver, and a spoke 12 connecting to a steering apparatus of the vehicle 1 and connecting the rim 11 to a hub of a rotation axis for steering. According to an embodiment, the steering wheel 10 may include an operating device 13 for controlling various devices in the vehicle 1, for example, the audio system, etc.

The dashboard 20 may further include an instrument panel 22 to inform the driver of various information about the vehicle 1, such as driving speed, mileage, Revolutions Per Minute (RPM) of engine, an amount of oil, a temperature of cooling water, and various warnings, etc., during driving, and a globe box to store various things.

The gear box 40 may be positioned between a driver seat and a passenger seat in the inside of the vehicle 1, and in the gear box 40, control units that the driver needs to manipulate during driving may be installed. The gear box 40 may be provided with the shift lever 41 for shifting gears of the vehicle 1.

Figure 2:
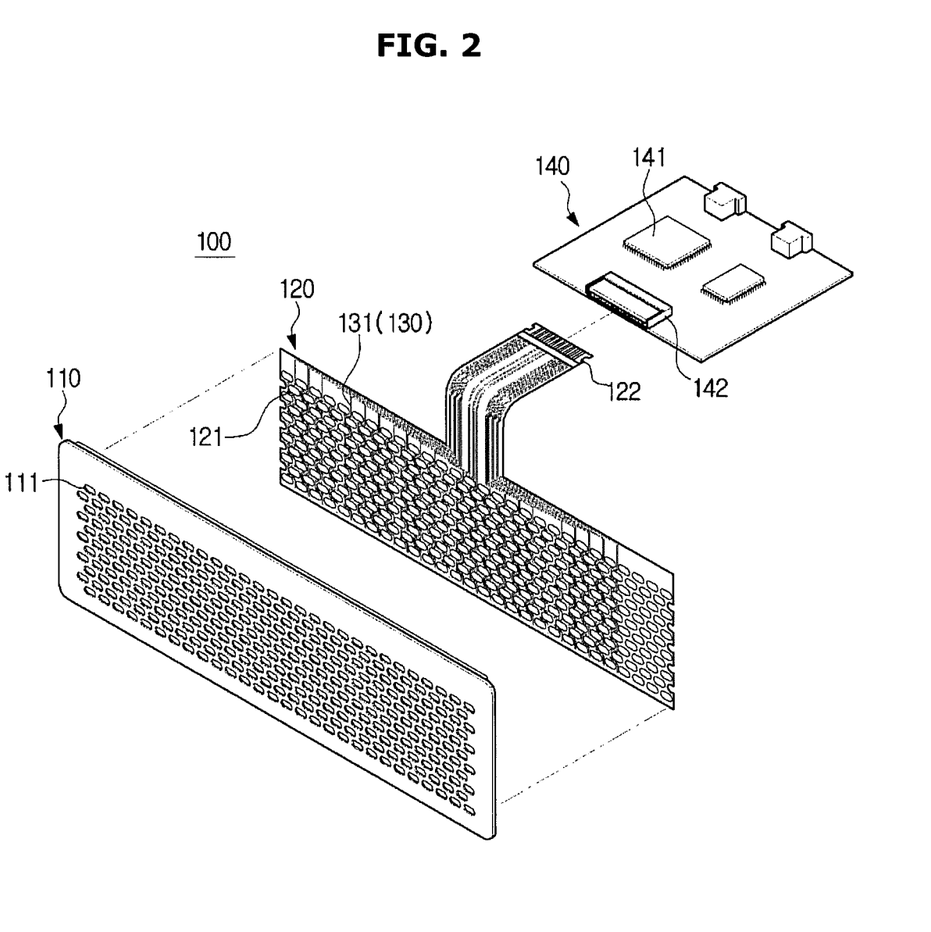
FIG. 2 is an exploded perspective view of a touch input device according to an exemplary embodiment of the present disclosure.

FIG. 2 is an exploded perspective view of a touch input device according to an exemplary embodiment of the present disclosure.

As shown in FIG. 2, the touch input device 100 according to an exemplary embodiment of the present disclosure may include a frame 110 having a plurality of frame holes 111, a flexible printed circuit board 120 coupled to one surface of the frame 110 and including a sensor electrode 130, and a sensor integrated circuit (IC) 141 electrically connected to the sensor electrodes 130 and configured to sense a change in capacitance of the sensor electrodes 130.

The frame 110 may include the plurality of frame holes 111. Each frame hole 111 may be in the shape of an oval, as shown in FIG. 2. However, the shape, number, and spacing of the frame holes 111 are not limited, and may depend on a design specification.

Since the plurality of frame holes 111 are formed in the frame 110, air, sound, etc. may pass relatively freely through the frame holes 111. The frame 110 may be used as a touch surface of the touch input device 100. Since the frame 110 is provided with the plurality of frame holes 111, the touch input device 100 according to the current embodiment of the present disclosure may have a plurality of holes on the touch surface. When the plurality of holes are provided on the touch surface, the utilization and design scalability of the touch input device 100 may be greatly improved. For example, as described above, the vent 60 of the air conditioner may be used as a touch input device. Alternatively, a speaker cover may be used as a touch input device.

According to an exemplary embodiment of the present disclosure, the frame 110 may be made of a nonconductive material. However, the frame 110 may be made of any other materials (for example, ABS).

According to an embodiment of the present disclosure, the frame 110 may include a flat surface or a gently curved surface. The flexible printed circuit board 120 may be coupled to one surface of the frame 110. When the frame 110 includes a curved surface or a discontinuous surface, the flexible printed circuit board 120 coupled to the frame 110 may operate abnormally.

The flexible printed circuit board 120 may include a plurality of holes 121.

The plurality of holes 121 may be arranged to correspond to the plurality of frame holes 111. Therefore, even if the flexible printed circuit board 120 is coupled to one surface of the frame 110, the flexible printed circuit board 120 may not block the plurality of frame holes 111. Accordingly, as described above, it may be possible to provide the touch input device 100 having a plurality of holes on the touch surface.

The flexible printed circuit board 120 may include a connector 122. The connector 122 may physically and electrically connect the flexible printed circuit board 120 to the printed circuit board 140. The sensor IC 141 may be mounted on the printed circuit board 140. The sensor IC 141 may be electrically connected to the sensor electrode 130 to sense a change in capacitance of the sensor electrode 130. The printed circuit board 140 may include a connecting portion 142 that is coupled to the connector 122.

The flexible printed circuit board 120 may include the sensor electrode 130. A plurality of sensor electrodes 130 may be provided on both surfaces of the flexible printed circuit board 120, respectively. For example, a plurality of sensor electrodes 131 and 132 may be provided on the front and rear surfaces of the flexible printed circuit board 120, respectively.

Figure 3:
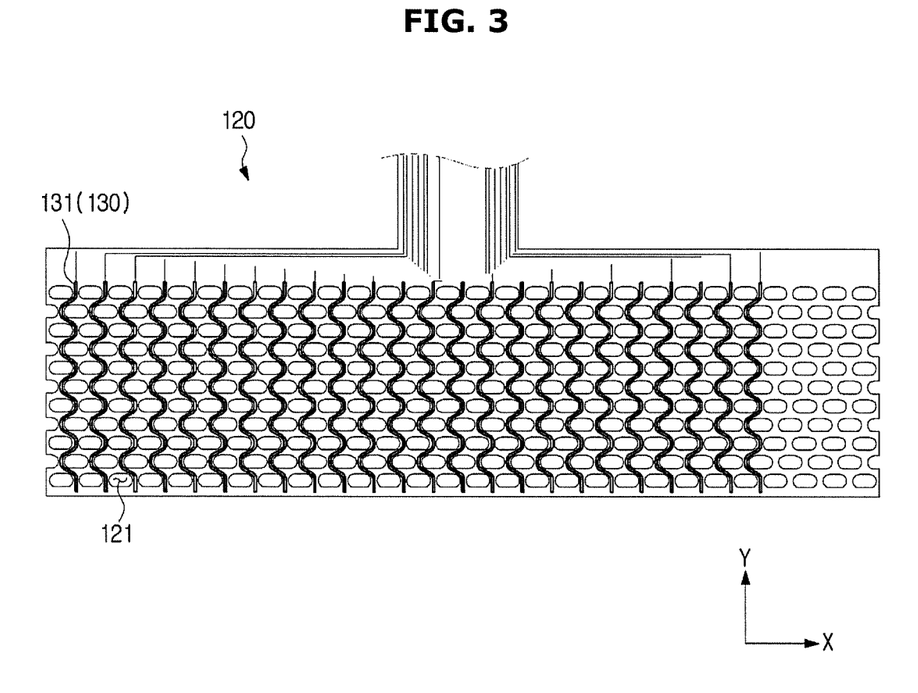
FIG. 3 shows a front surface of a flexible printed circuit board in the touch input device shown in FIG. 2.
Figure 4:
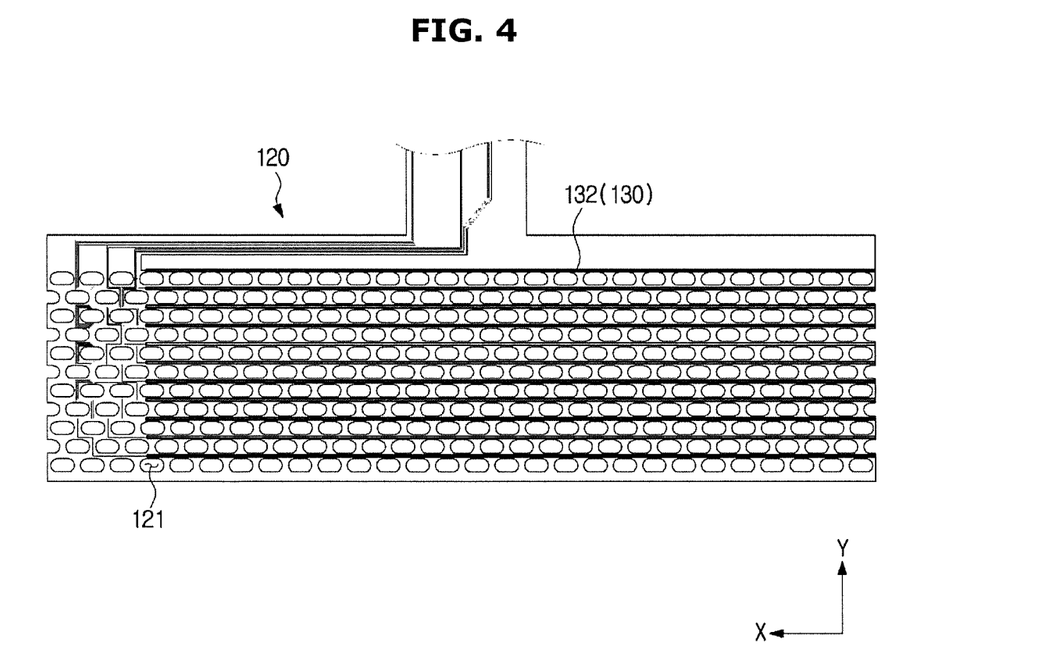
FIG. 4 shows a rear surface of a flexible printed circuit board in the touch input device shown in FIG. 2.

FIG. 3 shows a front surface of a flexible printed circuit board in the touch input device shown in FIG. 2, and FIG. 4 shows a rear surface of a flexible printed circuit board in the touch input device shown in FIG. 2.

The sensor electrode 130 may include a Tx electrode 131 and an Rx electrode 132. The Tx electrode 131 may be provided on the front surface of the flexible printed circuit board 120, and the Rx electrode 132 may be provided on the rear surface of the flexible printed circuit board 120. Alternatively, the Rx electrode 132 may be provided on the front surface of the flexible printed circuit board 120, and the Tx electrode 131 may be provided on the rear surface of the flexible printed circuit board 120.

As shown in FIG. 3, the Tx electrode 131 may extend in a first direction. In this case, the first direction may be a vertical direction of FIG. 3. In other words, the first direction may be a y-axis direction.

Referring to FIG. 3, the Tx electrode 131 may twist and turn in the first direction, although not limited thereto. However, the Tx electrode 131 may be formed in a straight line along the first direction depending on an arrangement of the plurality of holes 121.

An end of the Tx electrode 131 may be connected to the connector 122. The Tx electrode 131 may be connected to the connector 122 in various ways. For example, the Tx electrode 131 may be connected to the connector 122 by soldering.

As shown in FIG. 4, the Rx electrode 132 may extend in a second direction that intersects the first direction. In this case, the second direction may be a horizontal direction of FIG. 4. In other words, the second direction may be an x-axis direction.

Referring to FIG. 4, the Rx electrode 132 may be formed in a straight line along the second direction, although not limited thereto. However, the Rx electrode 132 may twist and turn in the second direction depending on an arrangement of the plurality of holes 121.

Like the Tx electrode 131, an end of the Rx electrode 132 may be connected to the connector 122. The Rx electrode 132 may be connected to the connector 122 in various ways. For example, the Rx electrode 132 may be connected to the connector 122 by soldering.

As shown in FIGS. 3 and 4, the Tx electrode 131 and the Rx electrode 132 may be positioned between the plurality of holes 121. Thereby, the frame 110 having the plurality of holes may be used as a touch surface.

Figure 5:
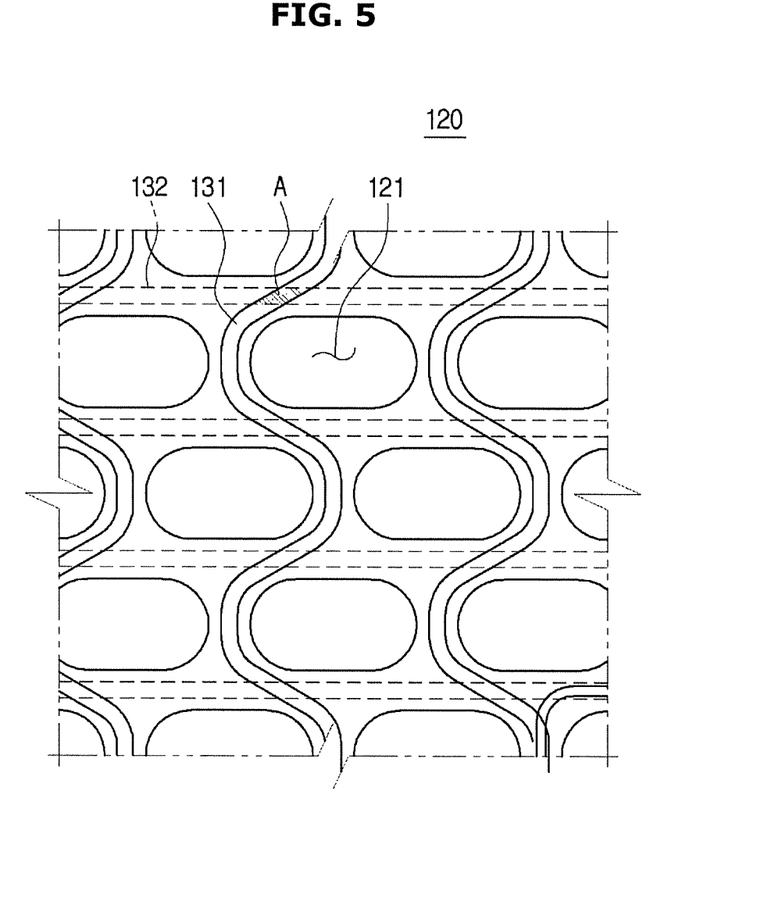
FIG. 5 is an enlarged view of a portion of a flexible printed circuit board in the touch input device shown in FIG. 2, showing Tx electrodes and Rx electrodes.

FIG. 5 is an enlarged view of a portion of the flexible printed circuit board in the touch input device shown in FIG. 2, showing Tx electrodes and Rx electrodes.

The Tx electrode 131 and the Rx electrode 132 may are physically separated from each other because they are respectively provided on the front and rear surfaces of the flexible printed circuit board 120. As shown in FIG. 5, even if the Tx electrode 131 and the Rx electrode 132 are located in the same area A of the flexible printed circuit board 120, the Tx electrode 131 and the Rx electrode 132 may be not physically connected to each other.

A size of the area A in which the Tx electrode 131 overlaps with the Rx electrode 132 in a front-rear direction may be minimized. According to an embodiment of the present disclosure, the sensor IC 141 may be a capacitive sensor of a mutual capacitance type. In this case, capacitance formed between the Tx electrode 131 and the Rx electrode 132 may decrease when a user's body part such as the user's finger approaches the sensor electrode 130. The sensor IC 141 may measure capacitance formed between the Tx electrode 131 and the Rx electrode 132, and sense capacitance that decreases when a user's body part such as the user's finger approaches or touches the sensor electrode 130, thereby determining whether the user's body part approaches or touches the sensor electrode 130.

The Tx electrode 131 may include no section that is parallel to the Rx electrode 132. This is because the area A which the Tx electrode 131 overlaps with the Rx electrode 132 in the front-rear direction increases when the Tx electrode 131 includes a section that is parallel to the Rx electrode 132. Therefore, the Tx electrode 131 may include no section that is parallel to the Rx electrode 132. As shown in FIG. 5, the Tx electrode 131 may include a section inclined with respect to the Rx electrode 132, or a section that is orthogonal to the RX electrode 132.

When the area A in which the Tx electrode 131 overlaps with the Rx electrode 132 in the front-rear direction increases, a capacitance value between the Tx electrode 131 and the Rx electrode 132, which is initially measured, may increase. In this case, there may be no significant decrease in magnitude of capacitance when a user's body part approaches or touches the sensor electrode 130. That is, the initially measured capacitance value (hereinafter, referred to as an initial value) may increase, whereas a decrease of the capacitance value (hereinafter, referred to as a change value) may be insignificant. When the initial value is great and the change value is small, it may be difficult to recognize the change value, and occurrence possibility of noise may increase, resulting in performance degradation of the sensor. Therefore, in order to prevent the performance degradation of the touch input device 100, it may be preferable that the size of the area A in which the Tx electrode 131 overlaps with the Rx electrode 132 in the front-rear direction is minimized, as shown in FIG. 5.

Figure 6:
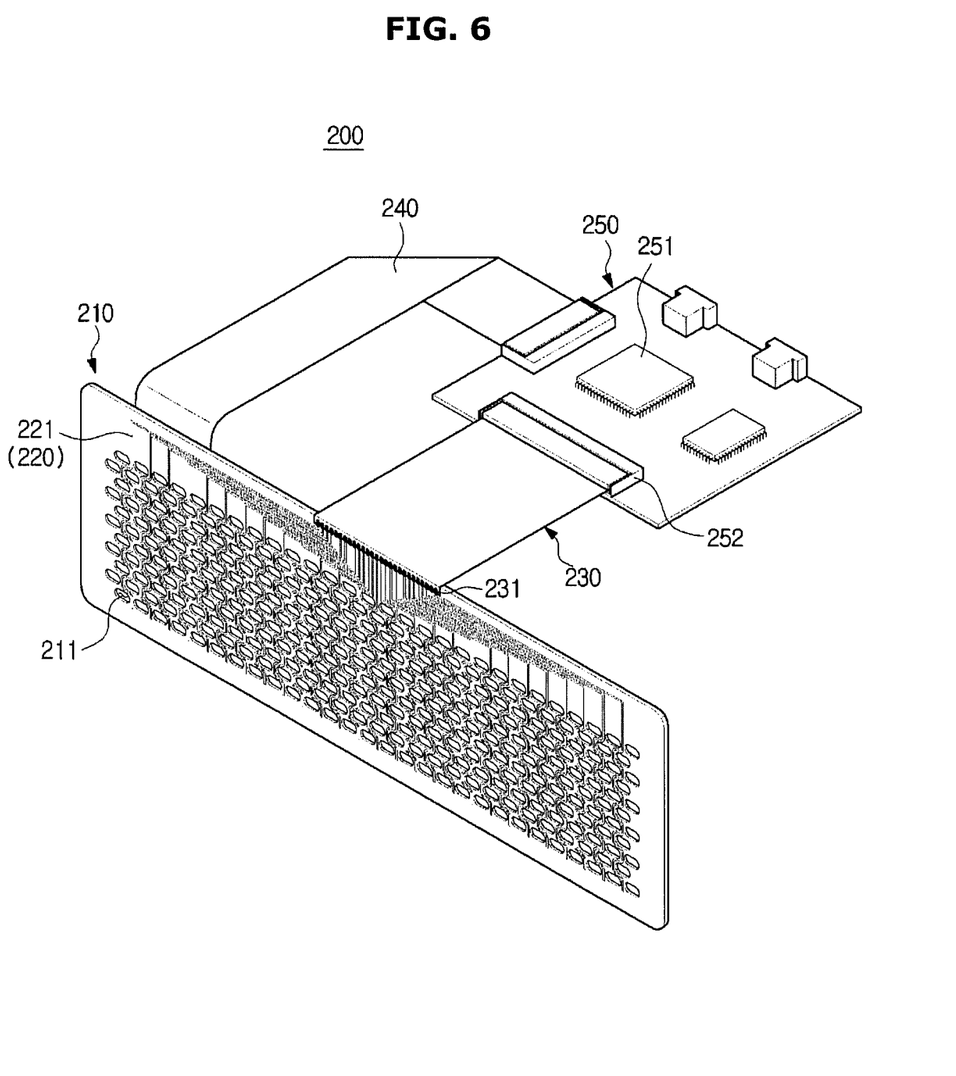
FIG. 6 shows a touch input device according to another exemplary embodiment of the present disclosure.

FIG. 6 shows a touch input device according to another embodiment of the present disclosure. As shown in FIG. 6, a touch input device 200 according to another embodiment may include a base 210 having a plurality of base holes 211, a sensor electrode 220 formed on the base 210, and a sensor IC 251 electrically connected to the sensor electrode 220 and configured to sense a change in capacitance of the sensor electrode 220.

According to another embodiment of the present disclosure, the base 210 may be made of a material including a metal composite. The reason may be to form sensor electrodes 111 to 114 using a LDS (Laser Directing Structure) process. The LDS process is to form a support base with a material including a nonconductive and chemically stable metal composite, to expose a part of the support base to Ultra Violet (UV) laser or excimer laser to release the chemical bonding of the metal composite and expose metal seeds, and then to metalize the support base to form a conductive structure on the exposed part of the support base.

The sensor electrode 220 may be formed on the base 210 by the LDS process. The sensor electrode 220 may be formed directly on the base 210 without any additional component coupled to the base 210.

The sensor electrode 220 may include a first sensor electrode 221 and a second sensor electrode 222. The first sensor electrode 221 may be a Tx electrode or an Rx electrode. The second sensor electrode 222 may be an Rx electrode or a Tx electrode.

The first sensor electrode 221 and the second sensor electrode 222 may be formed on the front and rear surfaces of the base 210, respectively.

The touch input device 200 may include a plurality of connectors 230 and 240 for electrically connecting the sensor electrode 220 to the sensor IC 251. The connectors 230 and 240 may be provided in various ways. As shown in the drawings, a flexible printed circuit board 250 may be coupled to the base 210 by soldering. Alternatively, the base 210 may extend to the printed circuit board 250, and the sensor electrode 220 may also extend to the printed circuit board 250 so that the base 210 is connected directly to the printed circuit board 250. Reference numeral 231 denotes a connection portion for connecting the flexible printed circuit board 250 to the first sensor electrode 221 by soldering. The printed circuit board 250 may include a connecting portion 252 that is coupled to the connector 230.

Figure 7:
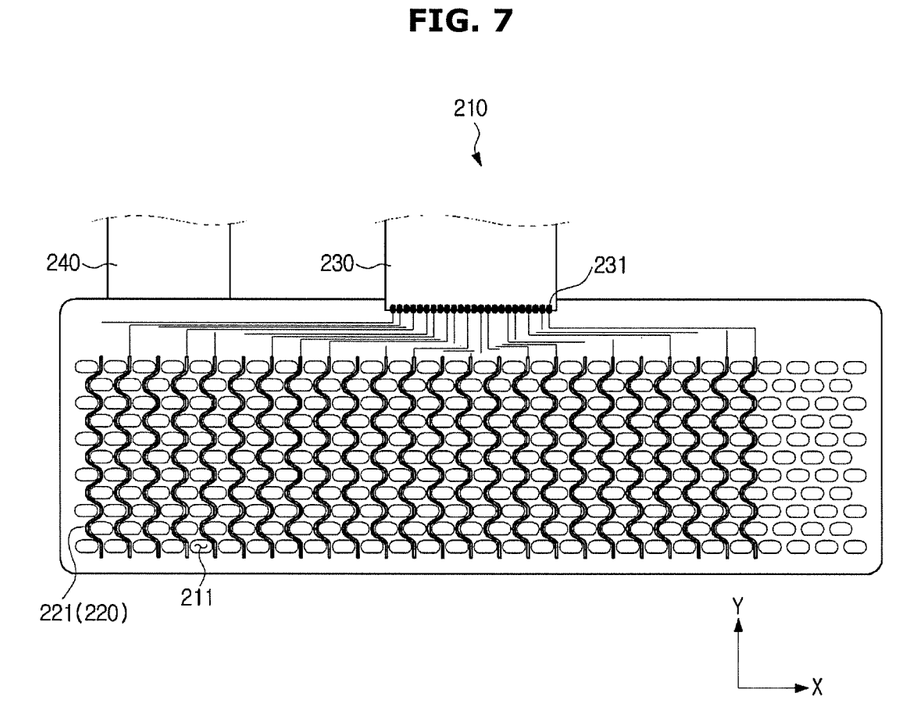
FIG. 7 shows a front surface of a base in the touch input device shown in FIG. 6.
Figure 8:
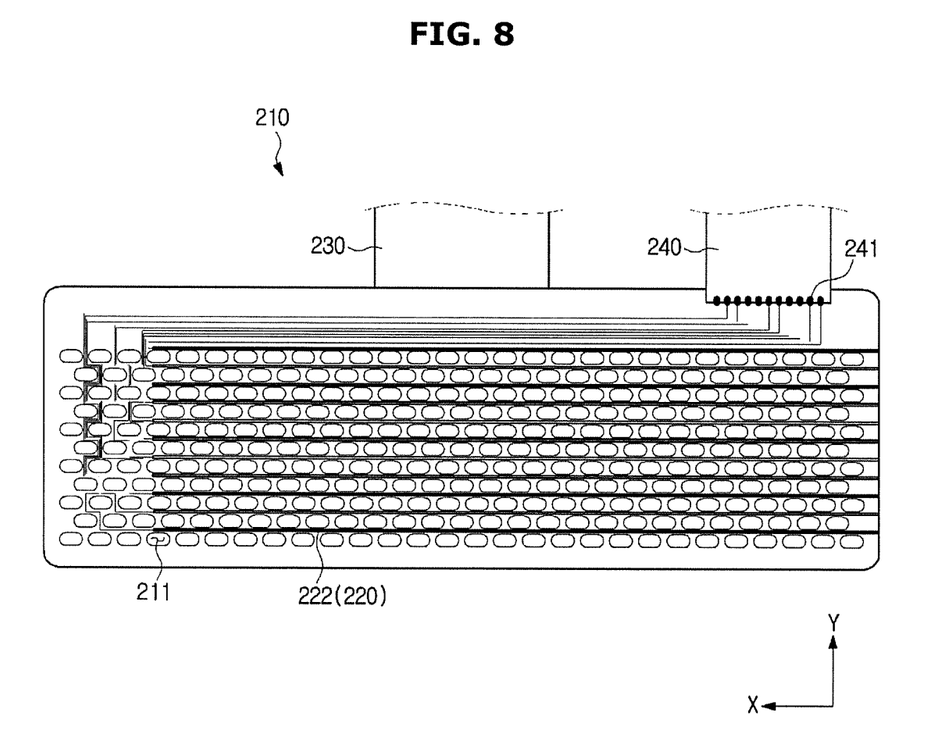
FIG. 8 shows a rear surface of a base in the touch input device shown in FIG. 6.

FIG. 7 shows a front surface of the base in the touch input device shown in FIG. 6, and FIG. 8 shows a rear surface of the base in the touch input device shown in FIG. 6.

As shown in FIGS. 7 and 8, the first sensor electrode 221 may be formed on the front surface of the base 210 by the LDS process, and the second sensor electrode 222 may be formed on the rear surface of the base 210 by the LDS process.

As shown in FIG. 7, the first sensor electrode 221 may extend in a first direction. In this case, the first direction may be a vertical direction of FIG. 7. In other words, the first direction may be an y-axis direction.

Referring to FIG. 7, the first sensor electrode 221 may twist and turn in the first direction, although not limited thereto. However, the first sensor electrode 221 may be formed in a straight line along the first direction depending on an arrangement of the plurality of holes 121.

An end of the first sensor electrode 221 may be connected to the connector 230. The first sensor electrode 221 may be connected to the connector 230 in various manners. For example, the first sensor electrode 221 may be connected to the connector 230 by soldering.

As shown in FIG. 8, the second sensor electrode 222 may extend in a second direction that intersects the first direction. In this case, the second direction may be a horizontal direction of FIG. 8. In other words, the second direction may be an x-axis direction.

Referring to FIG. 8, the second sensor electrode 222 may be formed in a straight line along the second direction, although not limited thereto. The second sensor electrode 222 may twist and turn in the second direction depending on an arrangement of the plurality of base holes 211.

Like the first sensor electrode 221, an end of the second sensor electrode 222 may be connected to the connector 240. The second sensor electrode 222 may be connected to the connector 240 in various ways, for example, by soldering.

As shown in FIGS. 7 and 8, the first sensor electrode 221 and the second sensor electrode 222 may be positioned between the plurality of base holes 211. Accordingly, the base 210 having the plurality of base holes 211 may be used as a touch surface of the touch input device 200.

The first sensor electrode 221 and the second sensor electrode 222 may be physically separated from each other because they are provided on the front and rear surfaces of the base 210, respectively. Even if the first sensor electrode 221 and the second sensor electrode 222 are located in the same area A of the base 210, the first sensor electrode 221 and the second sensor electrode 222 may be not physically connected to each other.

A size of the area A in which the first sensor electrode 221 overlaps with the second sensor electrode 222 in a front-rear direction may be minimized. According to another embodiment of the present disclosure, the sensor IC 251 may be a capacitive sensor of a mutual capacitance type. In this case, capacitance formed between the first sensor electrode 221 and the second sensor electrode 222 may decrease when a user's body part such as the user's finger approaches the sensor electrode 220. The sensor IC 251 may measure capacitance formed between the first sensor electrode 221 and the second sensor electrode 222, and sense capacitance that decreases when a user's body part such as the user's finger approaches or touches the sensor electrode 220, thereby determining whether the user's body part approaches or touches the sensor electrode 220.

The first sensor electrode 221 may include no section that is parallel to the second sensor electrode 222. This is because the area A which the first sensor electrode 221 overlaps with the second sensor electrode 222 in the front-rear direction increases when the first sensor electrode 221 includes a section that is parallel to the second sensor electrode 222. Therefore, the first sensor electrode 221 may include no section that is parallel to the second sensor electrode 222. The first sensor electrode 221 may include a section inclined with respect to the second sensor electrode 222, or a section that is orthogonal to the second sensor electrode 222.

When the area A in which the first sensor electrode 221 overlaps with the second sensor electrode 222 in the front-rear direction increases, a capacitance value between the first sensor electrode 221 and the second sensor electrode 222, which is initially measured, may increase. In this case, there may be no significant decrease in magnitude of capacitance when a user's body part approaches or touches the sensor electrode 220. That is, the initially measured capacitance value (hereinafter, referred to as an initial value) may increase, whereas a decrease of the capacitance value (hereinafter, referred to as a change value) may be insignificant. When the initial value is great and the change value is small, it may be difficult to recognize the change value, and occurrence possibility of noise may increases, resulting in performance degradation of the sensor. Therefore, in order to prevent the performance degradation of the touch input device 100, it may be preferable that the size of the area A in which the first sensor electrode 221 overlaps with the second sensor electrode 222 in the front-rear direction is minimized.

According to the embodiments of the present disclosure, the touch input device having a plurality of holes on a touch surface, and a vehicle including the touch input device may be provided.

According to the embodiments of the present disclosure, a touch input device including a plurality of holes through which air or sound easily enters or exits, and a vehicle including the touch input device may be provided.

According to the embodiments of the present disclosure, a touch input device using a vent of an air conditioner as a touch surface, and a vehicle including the touch input device may be provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A touch input device comprising:
   a frame having a plurality of frame holes;
   a flexible printed circuit board coupled to one surface of the frame and having a plurality of holes corresponding to the plurality of frame holes;
   a sensor electrode disposed on the flexible printed circuit board; and
   a sensor integrated circuit (IC) electrically connected to the sensor electrode and configured to sense a change in capacitance of the sensor electrode.

2. The touch input device of claim 1, wherein the sensor electrode comprises an Rx electrode and a Tx electrode.

3. The touch input device of claim 2, wherein
   the Rx electrode is disposed on a first surface of the flexible printed circuit board, and
   the Tx electrode is disposed on a second surface of the flexible printed circuit board, the second surface being opposite to the first surface of the flexible printed circuit board.

4. The touch input device of claim 2, wherein when the Rx electrode extends in a first direction, the Tx electrode extends in a second direction that intersects the first direction.

5. The touch input device of claim 1, wherein the sensor electrode is provided in plural and disposed between the plurality of holes.

6. The touch input device of claim 2, wherein when the Rx electrode is disposed on a front surface of the flexible printed circuit board and the Tx electrode is disposed on a rear surface of the flexible printed circuit board, the Rx electrode overlaps with the Tx electrode in a front-rear direction.

7. The touch input device of claim 1, wherein the frame is made of a nonconductive material.

8. The touch input device of claim 1, wherein
   the flexible printed circuit board further comprises a connector, and
   the connector electrically connects the flexible printed circuit board to a printed circuit board on which the sensor IC is mounted.

9. A vehicle comprising an air conditioner and a touch input device, wherein the touch input device comprises:
   a base including a metal composite and having a plurality of base holes through which air passing through the air conditioner is discharged;
   a sensor electrode which includes a plated sensor electrode or a metalized sensor electrode; and
   a sensor integrated circuit (IC) electrically connected to the sensor electrode and configured to sense a change in capacitance of the sensor electrode.

10. The vehicle of claim 9, wherein the sensor electrode comprises:
    a first sensor electrode disposed on a first surface of the base; and
    a second sensor electrode formed on a second surface of the base, the second surface being opposite to the first surface of the base.

11. The vehicle of claim 9, wherein the base comprises a curved surface or a discontinuous surface.

12. The vehicle of claim 9, further comprising a connector electrically connects the sensor electrode to a printed circuit board.

13. The vehicle of claim 10, wherein when the first sensor electrode is disposed on a front surface of the base and the second sensor electrode is disposed on a rear surface of the base, the first sensor electrode and the second sensor electrode are arranged such that the first sensor electrode overlaps with the second sensor electrode in a front-rear direction.

14. The vehicle of claim 9, further comprising a protective layer disposed on one surface of the base to cover the sensor electrode.

* * * * *